United States Patent [19]

Weis

[11] 3,801,075

[45] Apr. 2, 1974

[54] MECHANICAL AERATOR

[75] Inventor: Frank G. Weis, Kansas City, Mo.

[73] Assignee: Ecodyne Corporation, Chicago, Ill.

[22] Filed: July 3, 1972

[21] Appl. No.: 268,243

[52] U.S. Cl. .................................................. 261/91
[51] Int. Cl. .............................................. B01f 7/18
[58] Field of Search ........................ 261/91; 210/200

[56] References Cited
UNITED STATES PATENTS

| | | | |
|---|---|---|---|
| 1,497,425 | 6/1924 | Ames et al. | 210/200 |
| 2,054,395 | 9/1936 | Streander | 261/91 |
| 2,802,647 | 8/1957 | Bolton | 261/91 |
| 3,235,877 | 2/1966 | Grob | 261/91 |
| 3,341,450 | 9/1967 | Ciabattari et al. | 261/91 |
| 3,479,017 | 11/1969 | Thikotter | 261/91 |

Primary Examiner—Tim R. Miles
Assistant Examiner—Steven H. Markowitz
Attorney, Agent, or Firm—Joel E. Siegel

[57] ABSTRACT

A mechanical aerator for the aeration of a liquid, having an impeller positioned so as to contact the surface of the liquid, the impeller comprising: a shaft rotatable about a substantially vertical axis; and a plurality of backward curved vanes extending outwardly from the shaft, the vanes cuved such that as the impeller rotates about a substantially vertical axis a series of thin film waves emanate spirally outward and upward from the vanes, such that each particle of liquid contained therein moves radially outward from the axis of rotation. The vanes have a portion of increased depth at the area adjacent the shaft so as to gouge a hole of increased depth in the liquid and thereby facilitate rotation of the impeller. The vanes are curved such that as the impeller rotates the liquid is conveyed outward to an area of higher angular velocity.

7 Claims, 5 Drawing Figures

MECHANICAL AERATOR

BACKGROUND OF THE INVENTION

The present invention is concerned with aeration apparatus and in particular with mechanical surface aeration apparatus employed in the treatment of sewage by the activated sludge process. More particularly, this invention pertains to an improved impeller vane design for a mechanical aerator of the type disclosed in U.S. Pat. application Ser. No. 75,515, now U.S. Pat. No. 3,704,868 having the same inventive entity and assignee as the present invention.

The aeration of sewage is usually accomplished in an aeration tank; and two types of aeration apparatus have been used quite extensively in the past. A first type of aeration apparatus makes use of plates, or other bodies of porous material, through which air is forced under substantial pressure. This type requires very considerable amounts of power and is subject to the serious operational disadvantage that the plates, or other porous material, become clogged during use. The other type of aeration apparatus is of the mechanical agitation type, and involves the use of a power-driven surface mechanical aerator. This type aerator generally includes a rotor carrying a plurality of vanes or blades. The rotor is mounted at the surface of the liquid in the aeration tank with its blades partially submerged in the liquid. The surface mechanical aerator is particularly desirable in that its operation is inherently very reliable and not subject to changes over its operative life. Also, it is very much less expensive than the porous plate arrangements both as to original cost and as to maintenance.

The prior art mechanical aerators generally include a shaft rotatable about a vertical axis, and a plurality of radial vanes either slanted or straight in circumferential attack on the liquid. These aerators have a very serious drawback in that they cause the liquid in the tank to rotate around a vertical axis in the same direction as the vanes move, thereby preventing the rotating vanes from imparting maximum horsepower to the liquid. This rotational movement of the tank contents also results in stratified liquid zones in a shape resembling a doughnut. The particles in these zones continually rotate around the tank in such a manner that the oxygen level is never changed, nor are these particles brought near the oxygen producing source. The contents on the bottom of the tank circulate at a slow rate and the solids are never lifted from this spot. Further, these aerators throw out the liquid in coarse droplets and since the oxygen transfer from the air can only be at the surface of the droplet, the oxygen transfer is thus seriously limited.

SUMMARY OF THE INVENTION

It is a primary object of the present invention to provide mechanical surface aeration apparatus that transfers oxygen to the liquid at greater efficiency in terms of pounds of dissolved oxygen transferred in relation to driving horsepower than other aerators of this type.

Another object is to provide an improved impeller vane for mechanical surface aeration apparatus that imparts a high oxygen transfer rate at high horsepower requirements.

A further object of the present invention is to provide an aerator apparatus wherein the liquid thrown out from the impeller is substantially in thin film waves, so as to result in greater oxygen transfer.

Accordingly, the present invention provides an aerator of the paddle type with an open impeller having backward curved vanes. The vanes are curved in such a manner that the discharge of each particle of liquid thrown out by the impeller is radial from the axis of rotation of the impeller. The discharge may vary slightly from being radial, but not enough to cause rotation of the tank contents around a vertical axis. By use of the curved vanes, the liquid is thrown out from the impeller in a series of thin film waves spiraling outward and upward towards the sides of the tank, with each particle of liquid within the waves moving radially outward from the axis of rotation of the impeller. The thin film waves stretch out as they move outward from the impeller thereby continuously renewing the film surface particles, thus exposing new particles to the air and increasing oxygen transfer to all the liquid within the waves.

The vanes have an increased depth at the area adjacent the rotating shaft which sweeps a hole in the liquid of greater depth at the shaft or inner end of the vanes than at the outer ends of the vanes. This increased depth results in a greater pressure differential causing the liquid to rise at a higher rate after one vane has passed and before the next vane encounters the liquid. Since there is more water at the shaft ends of the vanes it takes less horsepower to move the liquid and due to the shape of the vanes the liquid is conveyed outward to higher angular velocity areas of the vanes where it is thrown higher in the air resulting in higher oxygen transfer and greater basin turnover rate or pumpage.

Other and more specific objects of the invention and various features of the invention will be made apparent in the following description of a preferred embodiment, and in the accompanying drawings wherein:

DESCRIPTION OF A PREFERRED EMBODIMENT

Figure 1:
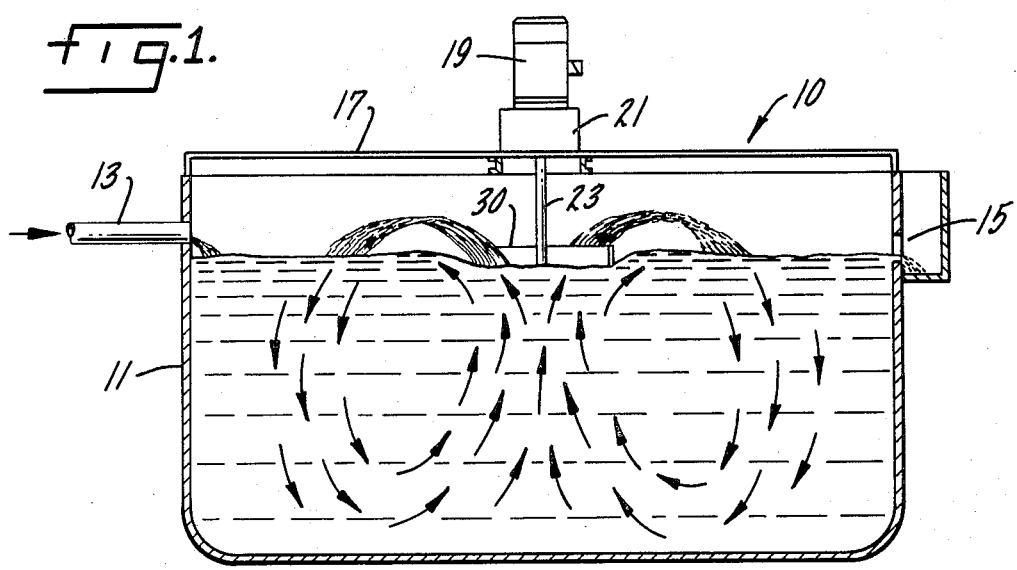
FIG. 1 is an elevational view, partially in cross section, which illustrates improved aeration apparatus embodying various features of the present invention.

Referring to FIG. 1, aeration system 10 includes an aeration tank 11 into which sewage is introduced through inlet 13 and removed through outlet 15. The tank 11 may be round, square, or rectangular in horizontal cross section, and its volume generally determines the size or capacity of the aerator used. Support bridge 17 extends across tank 11 and supports electric motor 19 and gear reducer 21 thereon. Vertical shaft 23 extends downwardly from gear reducer 21 and is connected to impeller 30 at its lowermost end.

Figure 2:
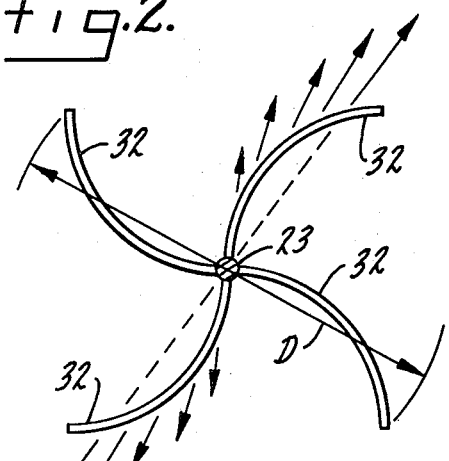
FIG. 2 is an enlarged plan view of the impeller portion of the aeration apparatus shown in FIG. 1.
Figure 3:
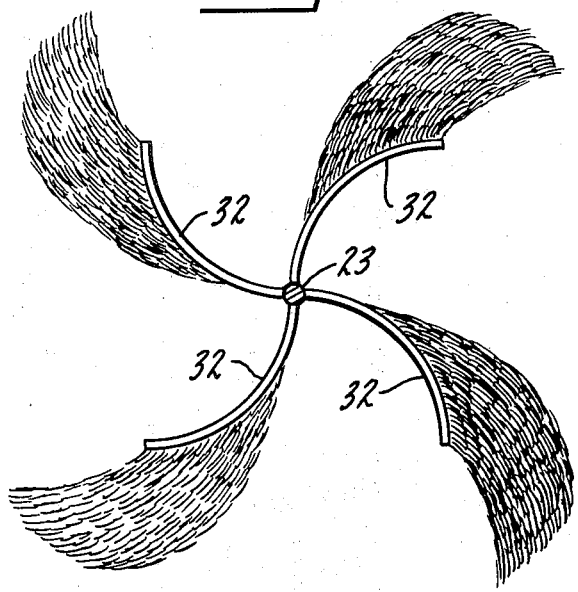
FIG. 3 is a plan view of the impeller, as in FIG. 2, showing the wave form of the liquid discharged from the impeller vanes.

The present invention is particularly concerned with the design of impeller 30. As seen in FIGS. 2 and 3, impeller 30 is of the open paddle type having a plurality of circumferentially spaced backward curved rigid impeller vanes 32 extending outwardly from shaft 23. It is the unique design of vanes 32 which result in the high efficiency of the present invention.

Figure 4:
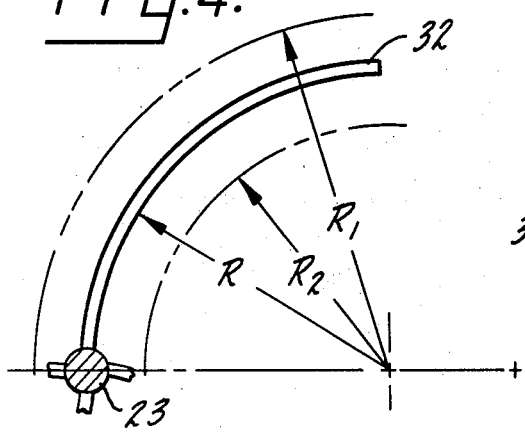
FIG. 4 illustrates a development of one of the vanes employed in the impeller shown in FIGS. 2 and 3.

As seen in FIGS. 2 and 4, each vane 32 is preferably, when viewed in plan, a quarter of a circle whose radius in inches is determined from the formula $$R = D-Rs/2.83 ,$$

where D is the diameter of impeller 30 in inches, and $R_s$ is the radius of shaft 23 in inches. Each vane 32 is generated from an axis of generation passing through the center of shaft 23 spaced 360/n degrees from the axis of generation of the adjacent vane, where n is the number of vanes in the particular impeller 30, at a distance R from the center of shaft 23.

Although the optimum shape of vanes 32 is as mentioned immediately above, some variations in this particular curvature are also suitable in the practice of the present invention. The present invention contemplates the use of similarly curved vanes which are shaped so as to fall within an area defined between first and second arcs having radii of curvature $R_1$ and $R_2$ respectively, as seen in FIG. 4. The arcs are generated from a point located on an axis of generation extending radially outward from the center of shaft 23 a distance equal to R (i.e., D—Rs/2.83) from the center of shaft 23. From this point the arcs are generated having the following radii of curvature:

$$R_1 = D-Rs/2.4$$

$R_2 = D-Rs/3.2$ where D is the diameter of the impeller in inches and $R_s$ is the radius of shaft 23 in inches.

Figure 5:
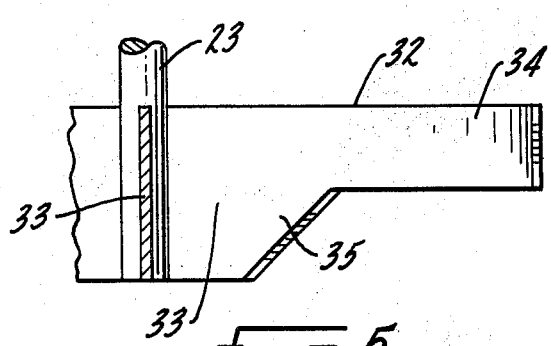
FIG. 5 is an enlarged elevational view of one of the impeller vanes constructed in accordance with the present invention.

Referring to FIG. 5, the width or depth of each vane 32 is increased at the inner portion 33 adjacent the shaft 23. The transition from the inner portion 33 to outer portion 34 is through an intermediate portion 35 having a gradually decreasing depth from the inside edge thereof to the outside edge thereof. The optimum number of vanes 32 is dependent upon the diameter of impeller 30. For example, it has been found that a 36 inch diameter impeller functions best with 4 vanes, whereas a 72 inch diameter impeller functions best with 6 vanes. Likewise, the widths or depths of portions 33 and 34 and the thickness of vanes 32 vary with the diameter of impeller 30.

In operation, a mixture of sewage and sludge enters tank 11 through inlet 13 and exits through outlet 15. Impeller 30 is preferably positioned in tank 11 such that its upper surface is adjacent the surface of the liquid in the tank. For example if the inner portions 33 of the vanes are 12 inches wide it is positioned such that the bottom surfaces thereof are 12 inches below the surface of the liquid prior to initiating rotation. Motor 19 supplies the energy to rotate impeller 30, via gear reducer 21 and shaft 23, in a counter-clockwise direction.

As impeller 30 rotates about a vertical axis vanes 32 cut through the liquid causing a quantity of liquid to be gouged from the contents. The increased depth at portions 33 of vanes 32 gouges a hole in the liquid of greater depth than the hole gouged by the portions 34 of vanes 32. This increased depth at the shaft or inner end of the vanes 32 causes an increased pressure differential causing the liquid to rise at a higher rate after one vane has passed and before the next vane encounters the liquid. Since there is more water at the shaft ends of the vanes 32 it takes less horsepower to move the liquid. The liquid is then conveyed outwardly due to the curved shape of the vanes 32 to an area of higher angular velocity where it is thrown high in the air.

The curved vanes gently loft the liquid into a series of thin film waves emanating spirally outward and upward towards the tank sidewalls, as illustrated in FIG. 3. These thin film waves stretch out as they move outward from vanes 32 thereby continuously renewing the surface particles exposed to the atmosphere. This results in a low oxygen gradient across the film thereby increasing the oxygen transfer. A secondary result is a high oxygen transfer at the liquid surface-air interface caused by the agitation of the falling cascades of the series of films.

Each particle of liquid within each film is moving in a direction substantially radially outward from the center of shaft 23, as indicated by the arrows in FIG. 2, thereby preventing the contents from rotating around a vertical axis. This enables vanes 32 to impart maximum energy to the tank contents. Removal of this rotational motion also prevents the formation of stratified liquid zones which continually rotate around the tank such that the particles within such zones are not brought in contact with the oxygen producing source.

Impeller 30 circulates the tank contents by rotating them around a horizontal axis as indicated by the arrows in FIG. 1. This circulation prevents the formation of dead pockets where no aeration takes place and solids settle. The liquid and solids are drawn up from the bottom of tank 11 by impeller 30 as a rising vertical column so as to throughly mix the contents of tank 11. This is accomplished without the use of draft tubes found in many prior art aerators.

The invention thus provides an improved aeration apparatus which produces a significant increase over other aerators of this type in the efficiency of oxygen transfer in terms of pounds of dissolved oxygen transferred in relation to driving horsepower.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. In a paddle type aerator of the type used for the aeration of sewage, having an impeller positioned so as to contact the surface of the sewage, said impeller comprising:

a. a shaft rotatable about a substantially vertical axis;

b. a plurality of elongated substantially horizontal open backward curved vane means extending outwardly from said shaft, said vane means having a portion of increased depth at the area adjacent said shaft so as to facilitate the rotation thereof; and c. said vane means being curved such that as said impeller rotates about a substantially vertical axis a series of thin film waves emanate spirally outward and upward from the convex surface of said vane means, such that each particle of sewage contained therein moves radially outward from said axis of rotation.

2. The invention as defined in claim 1 wherein each of said vane means being contained within an area defined between first and second circular arcs, said first and second arcs both being generated from a point located on a reference line extending radially outward from said shaft and spaced a distance equal to $D-R_s/2.83$ from the center of said shaft, said first arc having a radius of curvature equal to $D-R_s/2.4$ and said second arc having a radius of curvature equal to $D-R_s/3.2$, where D is the diameter of the impeller in inches and $R_s$ is the radius of the shaft in inches.

3. The invention as defined in claim 1 wherein each of said vane means being a portion of a cylinder whose radius of curvature is substantially equal to $D-R_s/2.83$, where D is the diameter of the impeller in inches and $R_s$ is the radius of the shaft in inches.

4. In a sewage treatment apparatus including a container having an inlet and an outlet adapted for flow of sewage therethrough, aeration means having an impeller positioned so as to contact the surface of the sewage, and means to rotate said impeller; said impeller comprising:
   a. a shaft rotatable about a substantially vertical axis; and
   b. a plurality of elongated substantially horizontal open backward curved vane means extending outwardly from said shaft, said vane means having a portion of increased depth at the area adjacent said shaft so as to facilitate the rotation thereof; and
   c. said vane means being curved such that as said impeller rotates about said substantially vertical axis the sewage particles that contact said vane means are thrown outward along a line substantially radial to said axis of rotation in a series of thin film waves spiralling outward and upward therefrom.

5. The invention as defined in claim 4 wherein each of said vane means being contained within an area defined between first and second circular arcs, said first and second arcs being generated from a point located on a reference line extending radially outward from said shaft and spaced a distance equal to $D-R_s/2.4$ and said second arc having a radius of curvature equal to $D-R_s/3.2$, where D is the diameter of the impeller in inches and $R_s$ is the radius of the shaft in inches.

6. The invention as defined in claim 4 wherein each of said vane means being a portion of a cylinder whose radius of curvature is substantially equal to $D-R_s/2.83$, where D is the diameter of the impeller in inches and $R_s$ is the radius of the shaft in inches.

7. In a paddle typer aerator of the type used for the aeration of sewage, having an impeller positioned so as to contact the surface of the sewage, said impeller comprising:
   a. a shaft rotatable about a substantially vertical axis;
   b. a plurality of elongated substantially horizontal open backward curved vane means extending outwardly from said shaft, said vane means having a portion of increased depth at the area adjacent said shaft so as to gouge a hole of increased depth in the sewage and thereby facilitate rotation thereof; and
   c. said vane means being curved such that as said impeller rotates about a vertical axis the sewage is conveyed outward to an area of high angular velocity and thrown in the air in a series of thin film waves which emanate spirally outward and upward from the convex surface of said vane means.

* * * * *